United States Patent [19]

Simar et al.

[11] Patent Number: 5,356,112
[45] Date of Patent: Oct. 18, 1994

[54] ELECTRICALLY CONTROLLED VALVE HAVING A TOTALLY LEAKPROOF VALVE PLUG

[75] Inventors: Patrick Simar, Pinterville; Francis Meyer, La Mare/S Venables; Jean-Luc Pattyn, St Marcel, all of France

[73] Assignee: Societe Europeenne de Propulsion, Suresnes, France

[21] Appl. No.: 84,756

[22] Filed: Jun. 29, 1993

[30] Foreign Application Priority Data

Jul. 9, 1992 [FR] France .................... 92 08547

[51] Int. Cl.⁵ .................... A16K 31/04; A16K 5/00
[52] U.S. Cl. .................... 251/129.11; 251/65;
251/129.05; 251/129.12; 251/129.21;
137/625.41
[58] Field of Search ............ 251/129.11, 65, 352,
251/129.12, 129.21, 129.05; 137/625.41

[56] References Cited

U.S. PATENT DOCUMENTS

| | | |
|---|---|---|
| 3,206,160 | 9/1965 | Bennett . |
| 3,347,262 | 10/1967 | Gibson . |
| 4,327,892 | 5/1982 | Ruyak . |
| 4,838,954 | 6/1989 | Perach .............. 251/129.08 X |
| 5,011,112 | 4/1991 | Glamm .............. 251/129.11 |
| 5,083,744 | 1/1992 | Reinicke et al. ...... 251/129.11 |

FOREIGN PATENT DOCUMENTS

| | | |
|---|---|---|
| 3936430 | 5/1991 | Fed. Rep. of Germany . |
| 2577646 | 8/1986 | France . |

*Primary Examiner*—Arnold Rosenthal
*Attorney, Agent, or Firm*—Weingarten, Schurgin, Gagnebin & Hayes

[57] ABSTRACT

The present invention relates to an electrically controlled leakproof valve having a fluid feed channel and at least one channel for delivering said fluid, rotary displacement of a distributor plug in said valve being under the control of an actuator. The actuator comprises an axially pierced rotor through which the fluid from the feed channel flows without headloss, the actuator being connected to the valve body in leakproof manner without using dynamic sealing devices. The present leakproof valve is particularly suitable for use in corrosive environments, and in particular under cryogenic conditions.

17 Claims, 6 Drawing Sheets

FIG_1

FIG_4

FIG_2

FIG_3

FIG_5

FIG_6

FIG_7

FIG_8

ELECTRICALLY CONTROLLED VALVE HAVING A TOTALLY LEAKPROOF VALVE PLUG

FIELD OF THE INVENTION

The present invention relates to a regulator valve that is electrically controlled and that has a totally leakproof valve plug for use in environments that are hostile or corrosive, e.g. environments that are cryogenic, radioactive, or bacterial, and that are required to be totally leakproof.

PRIOR ART

In valves having a spherical plug, liquid is transferred from an inlet to an outlet through the plug which is constituted by a solid sphere having a duct hollowed out therein, with displacement of the sphere being controlled by a drive device that is manual or automatic.

Thus, Document FR-A-2 539 204 shows a valve having two or three ports, and in which the plug is driven by an electric motor and gear box unit whose outlet shaft is coupled to the control square of the valve.

However, that type of motor-driven valve which constitutes a classic example of the prior art suffers from numerous drawbacks: firstly it is bulky because of the drive device which projects relative to the valve body; then, if the valve is to operate under high pressure, problems of leakage arise which are particularly difficult to solve and which lead to an increase in maintenance and operating cost; finally, that type of valve turns out to be completely unsuitable for transporting dangerous fluids.

OBJECT AND BRIEF SUMMARY OF THE INVENTION

An object of the invention is to mitigate the drawbacks of the prior art and to provide an electrically controlled valve that is totally leakproof and suitable for operating in the widest variety of environments.

Another object of the invention is to provide a valve that is particularly compact and suitable for being implemented reliably at high pressure and at high flow rate.

According to the invention, these objects are achieved by an electrically controlled leakproof valve comprising a fluid feed channel and at least one delivery channel for said fluid, rotary displacement of a distributor plug of said valve being controlled by an actuator, the actuator comprising a rotor that is axially pierced and through which the fluid from the feed channel flows without headloss, the connection to the valve body being provided in sealed manner without using dynamic sealing devices.

The considerable reduction in bulk, both in volume and in disposition, achieved by placing the actuator on the inlet or outlet channel causes the valve of the invention to be exceptionally compact.

In addition, by eliminating the dynamic seals that are usually required in this type of valve for providing leakproof connection between the valve and the actuator, it is possible to increase the lifetime of the device considerably while also providing better reliability.

The actuator includes a Jacket in the magnetic gap, which Jacket co-operates with the body of the valve to form a one-piece structure ensuring that the fluid is confined.

This one-piece structure can be made using conventional stamping techniques, facilitates manufacture of the valve, and simplifies assembly and maintenance thereof.

Advantageously, the stator of the actuator may also be immersed in the fluid. In such a configuration where there is no Jacket in the magnetic gap the fluid being confined by the stator casing only, it is necessary for the fluid to be less aggressive so as to ensure that the valve of the invention operates properly.

In a first embodiment, the connection between the actuator rotor and the plug is provided by means of a claw coupling.

In a second embodiment, the actuator rotor and the plug form a single element.

Since the very structure of the invention eliminates all axial thrust as generated by the pressure of the fluid acting on the surface of the plug shaft, axial forces can be taken up by ball bearings, and mere smooth bearings may suffice for the actuator.

Preferably, each fluid outlet is provided with a sealing assembly including gaskets that are retractable or otherwise.

The valve of the invention having a distributor plug can be easily transformed into a mixing valve merely by interchanging the fluid inlet and outlet ports, the feed channel then constitutes an outlet, while the delivery channels then constitute inlets.

According to a first special characteristic, the actuator has open loop type control, in which case the actuator may be a simple stepper motor.

According to a second special characteristic, actuator control is of the closed loop type, and the position information then required for this type of control can be obtained from a detector that senses various angular positions of the plug or that evaluates successive angles of rotation of the plug.

Advantageously, in order to facilitate dimensioning of the actuator, the valve may include an immersed stepdown gear disposed on the feed channel between the rotor of the actuator and the plug.

BRIEF DESCRIPTIONS OF THE DRAWINGS

Other advantages and characteristics of the present invention appear more clearly on reading the following description, given by way of non-limiting indication and made with reference to the accompanying drawings, in which.

DETAILED DESCRIPTION OF PARTICULAR EMBODIMENTS

Figure 1:
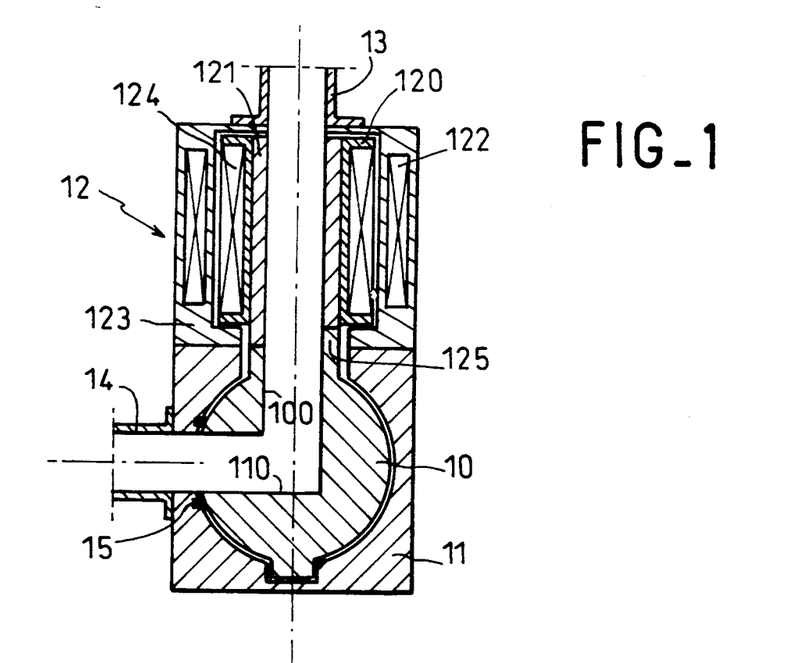
FIG. 1 is a diagrammatic section through a first embodiment of a leakproof valve of the invention.

FIG. 1 is a simplified section through an electrically controlled leakproof valve of the invention having a distributor plug.

The valve mainly comprises a spherical plug 10 disposed in a valve body 11, and an electrical actuator 12. A feed channel 13 and a delivery channel 14 serve to transfer the liquid to be distributed or mixed (depending on the function to be performed by the valve) through the plug and through the actuator.

The spherical plug 10 has an axial bore 100 and an internal 90° bend 110, and at each fluid outlet interface, the valve body 11 has a sealing assembly, e.g. constituted by an O-ring 15.

The electrical actuator 12 comprises firstly a rotor 120 that is axially pierced and whose shaft 121 is united with the plug 10, and secondly a stator 122 whose box or casing 123 is united with the valve body 11. The rotor is immersed in the fluid and may comprise, for example, permanent magnets 124, in which case the stator can be wound simply. The rotor shaft and the plug may be united by any suitable coupling device, e.g. by means of a claw coupling 125.

The operation of such a valve is particularly simple, with angular positioning of the rotor-and-plug assembly being obtained by applying electrical current to the stator windings of the actuator. It is then possible to direct and regulate the flow of fluid to any one of the delivery channels, or else to distribute the flow between two outlets that are 90° apart. Clearly such an embodiment provides for a high degree of flexibility both in fluid feed and in fluid delivery. Operation can be either as a distributor valve or as a mixer valve merely by interchanging the fluid inlets and outlets, and there may be multiple outlet interfaces, e.g. four such interfaces at 90° intervals.

Similarly, although the valve described above has a plug that is spherical and an actuator of the brushless autosynchronous type, it is clear that the invention is not limited to that particular plug or to that particular motor, but that other types of plug or motor could equally well be used. For example, the stator could be of the permanent magnet type with the permanent magnet being displaced either manually or by means of any kind of device.

Figure 2:
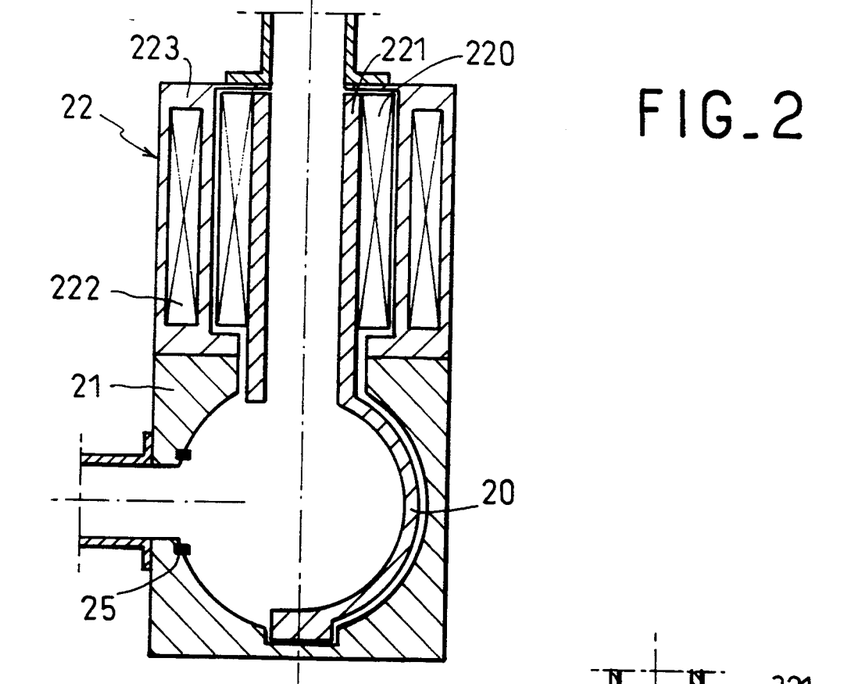
FIG. 2 is a diagram of a second embodiment of a leakproof valve of the invention.

FIG. 2 is a simplified diagram of a valve whose plug is no more than a spherical cap 20 and whose actuator is constituted by a variable reluctance motor 22. This actuator comprises firstly an immersed variable reluctance motor 220 that is axially pierced with its shaft 221 being united with the spherical cap 20, and secondly a wound stator 222 received in a casing 223 secured to the valve body 21.

The connection between the plug and the rotor is permanent, with the shaft of the rotor 221 and the spherical cap 20 forming a single piece. As before, a sealing assembly may be provided at each fluid outlet interface (for reasons of simplification, the rings or analogous devices required for holding the O-ring 25 in place are not shown).

Figure 3:
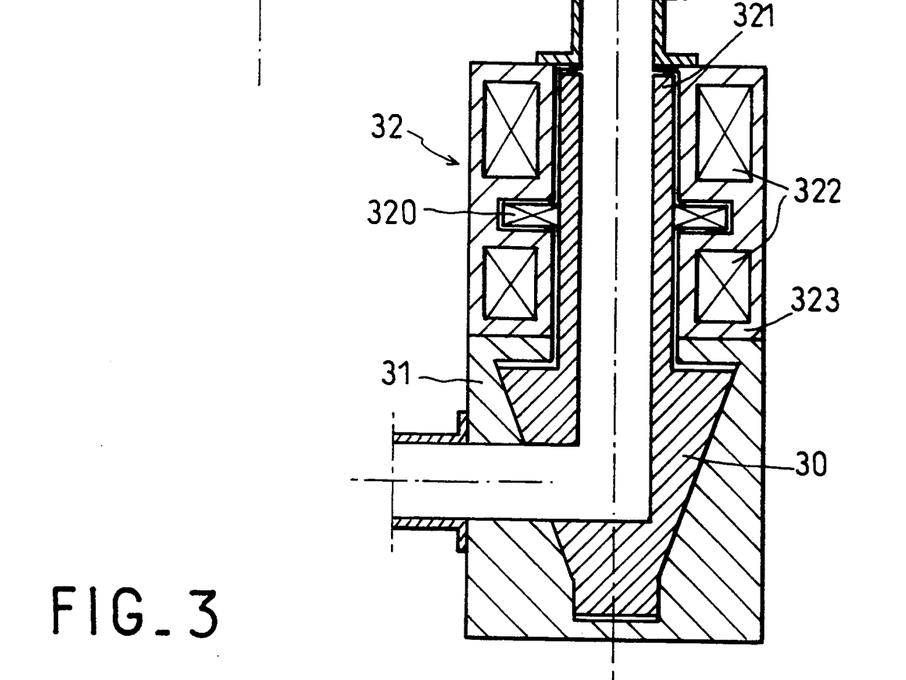
FIG. 3 is a diagram of a third embodiment of a leakproof valve of the invention.

Similarly, FIG. 3 is a diagram of a valve having a conical plug 30 which is pierced axially and provided with an internal 90° bend, the plug being under the control of a stepper motor 32. This actuator 32 comprises firstly a disk-shaped rotor 320 mounted on a tubular cylinder 321 and immersed in the fluid, and secondly a wound stator 222 disposed on either side of the rotor disk and secured to the valve body 31. The plug 30 and the tubular cylinder carrying the rotor form a single piece with sealing at the fluid outlet interfaces being achieved, in this case, merely by cone-on-cone contact between the plug and the valve body.

The above three embodiments shown diagrammatically are not the only embodiments possible. A cylindrical plug can be used, and other types of motor could be used such as a motor having brushes and a wound rotor cooperating with a stator having permanent magnets, or else a torque motor, for example. Any type of electrical motor may be used with the particular type that is chosen depending, in particular, on the fluid to be conveyed. Thus, when using a rotor having permanent magnets and no windings, care must be taken to ensure that the magnets are adequately protected to prevent them oxidizing.

If the fluid makes it possible, i.e. if the fluid is not corrosive, the stator may also be immersed, and fluid confinement instead of being provided by a jacket occupying the magnetic gap between the stator and the rotor is then provided directly by the stator casing. In either case (rotor-only immersed, or rotor-and-stator immersed), the valve of the invention can withstand high pressures, the liquid being confined either by the stator casing which is secured to the framework of the machine that incorporates the valve, or else by the jacket in the magnetic gap, with the stator then serving as banding means for the jacket.

The various materials used must be selected with special care on the basis of their magnetic and mechanical characteristics. Furthermore, if the valve is used with fluids that are foodstuffs, then the materials used must also satisfy the hygiene and safety standards that are in force.

Under cryogenic conditions, the materials used will be selected particularly for their compatibility with operating conditions, in particular with respect to temperature and vibration, to electromagnetic performance and to the fluid conveyed, since the very low temperatures used have the effect of reducing the resistance of the windings and thus reducing the electrical power required and of increasing the reliability of the assembly. It should be observed that superconductive operation could be envisaged.

In numerous applications, rotary displacement of the plug will be controlled directly by the actuator. However, in some special applications where a high value of torque is required to actuate the plug, it may be advantageous to place an immersed stepdown gear between the actuator and the plug.

Figure 4:
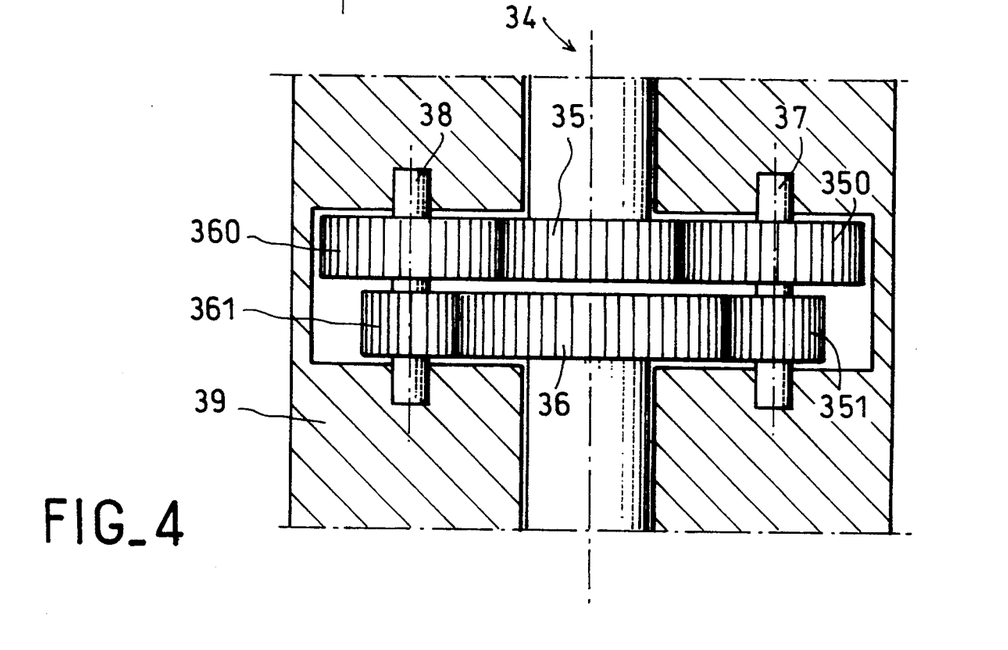
FIG. 4 shows a leakproof stepdown gear operating in a valve of the invention.

FIG. 4 shows such a stepdown gear 34 which comprises a first gear wheel 35 secured to the rotor shaft and a second gear wheel 36 secured to the plug. Each of these gear wheels meshes with two diametrically opposite pinions 350, 351, or 360, 361, with the pinions on either side sharing common axes of rotation 37 and 38. With such a structure, the stepdown ratio is a function of the ratios of the diameters of the various gear wheels and pinions, and is easily evaluated.

The body of the gear unit 39 supporting the pinions 350, 361; 351, 361 and their rotary axles 37 and 38 is connected firstly to the stator casing 123, 223, 323 of the actuator, and secondly to the valve body 11, 21, 31. It may be observed that to facilitate control of the coupling between the actuator and the plug, it would be quite possible to use clutches or brakes. The coupling provided could then either be continuous or on/off, depending on the kind of device that is used.

Figure 5:
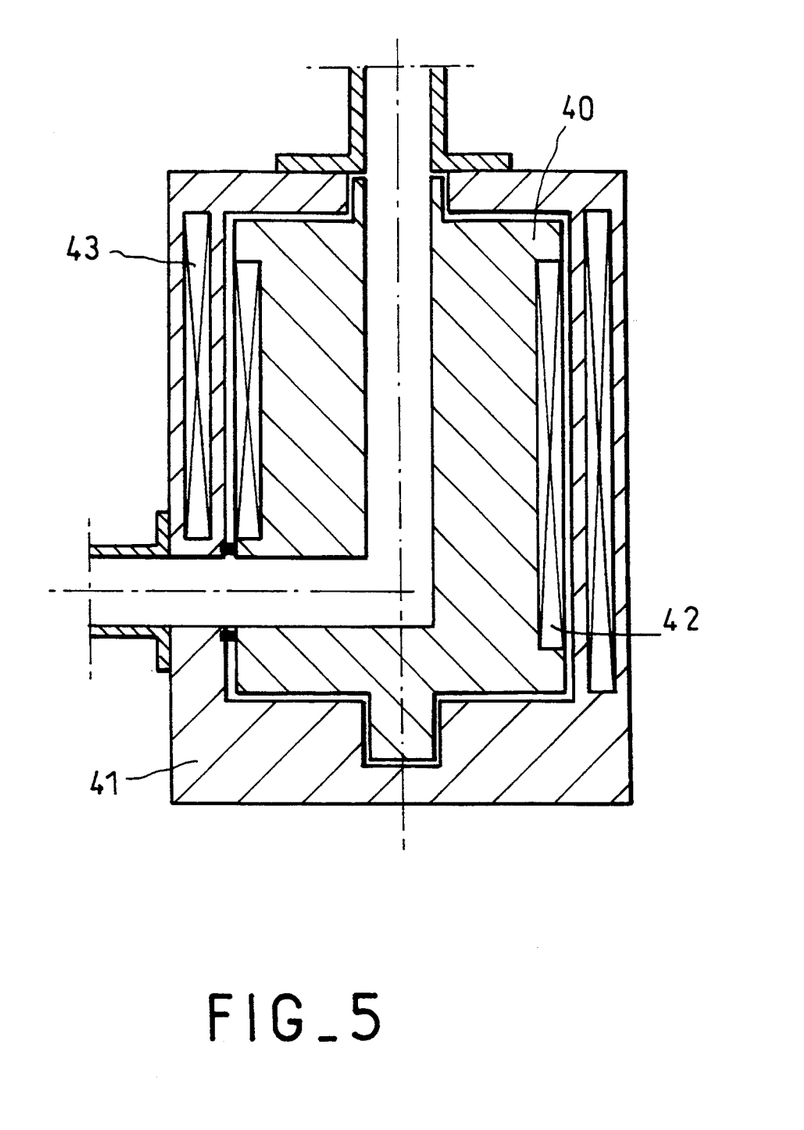
FIG. 5 is another diagram of a possible embodiment of the invention.

FIG. 5 is a diagram of another embodiment of a valve of the invention in which the valve body and the stator casing form a common body 41, the plug 40 being cylindrical in shape and including the rotor 42 of the actuator. The plug is pierced axially and it is provided with an internal 90° bend. It should be observed that this angle is given by way of preferred example, but that other inlet/outlet angles could equally well be chosen.

Figure 6:
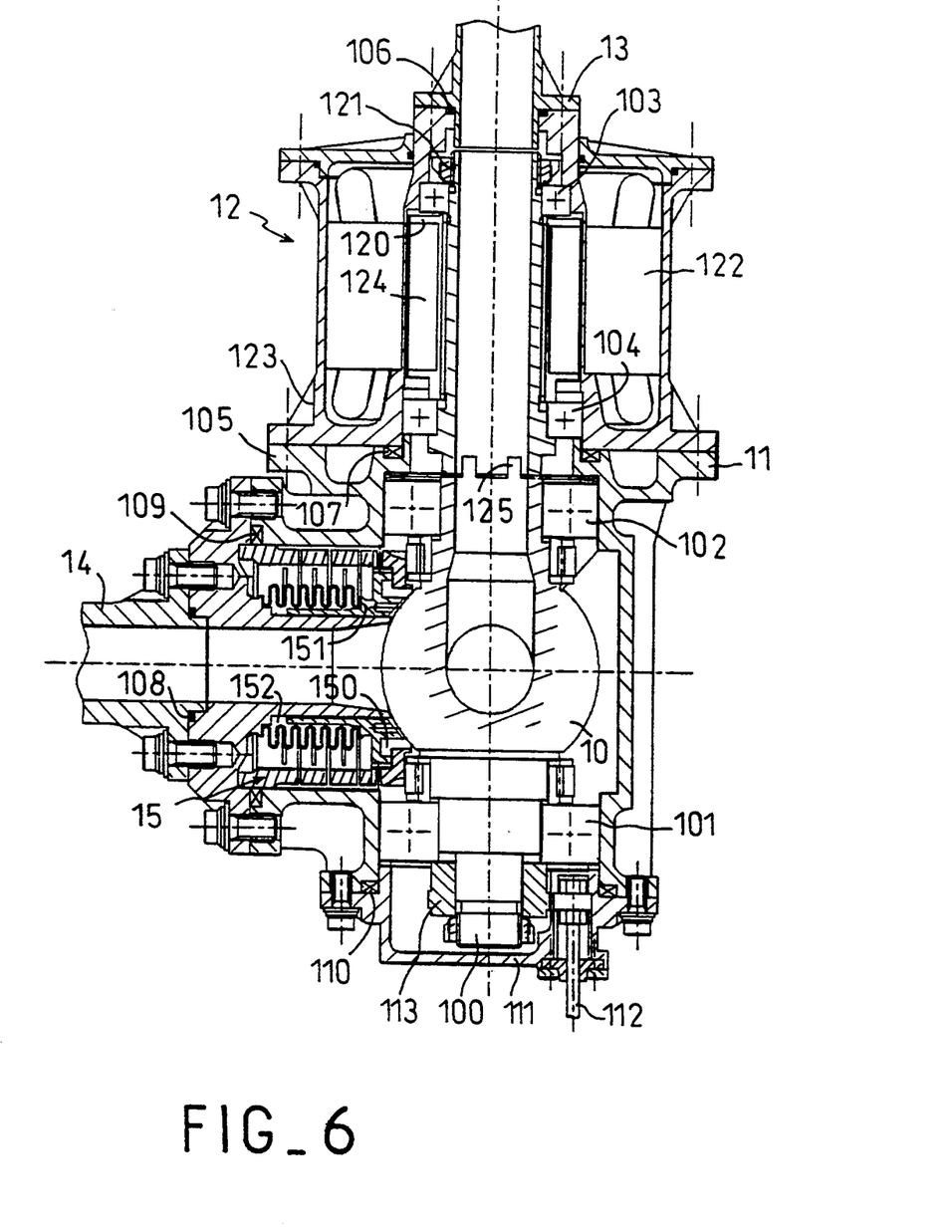
FIG. 6 is a more detailed diagram showing a practical embodiment of a FIG. 1 valve.

FIG. 6 shows a first practical embodiment of a valve of the invention implemented on the basis of the structure shown in FIG. 1. Identical elements are given the same references. There can be seen the spherical plug 10 whose shaft 100 is coupled by a claw coupling 125 to the shaft 121 of the rotor 120 that has permanent magnets 124. The shaft of the plug is free to rotate relative to the valve body 11 being supported by two ball bearings 101 and 102, and the shaft of the rotor rotates freely in the magnetic gap jacket that also forms part of the stator casing 123, the rotor shaft being supported by smooth bearings 103 and 104.

It is possible to use smooth bearings in the actuator because of the small amount of loading on these bearings, nearly all of the forces involved being taken up by the ball bearings supporting the plug, which bearings may be of the deep groove type, for example.

However, it may be observed that the takeup of axial forces as performed by these bearings could be organized differently.

The stator casing is connected to the valve body by means of fixing screws 105, not shown. The sealing assemblies 15 disposed at the fluid outlet interfaces are retractable devices comprising a gasket 150 supported by a gasket carrier 151, the gasket being held in contact with the plug by means of a resilient assembly 152 that bears firstly on the valve body and secondly on the gasket carrier.

Static sealing O-rings 106, 107, and 108 are placed respectively between the fluid feed (inlet) channel 13 and the stator casing 123, between the stator casing 123 and the valve body 11, and between the valve body 11 and the fluid delivery (outlet) channel 14. For practical implementation purposes, the valve body 11 is made up of a plurality of parts that require additional sealing gaskets 109 and 110. In particular, the free end of the plug shaft 100 may be accessible by removing a cover 111 fixed to the valve body and including a device 112 for measuring the angular position of the plug and designed to co-operate with a disk 113 secured to the shaft 100 of the plug. This measurement may be performed by a variable reluctance sensor or by an optical fiber sensor or by any other type of sensor. It is not essential for the sensor to be located at the end of the plug shaft, and it could perfectly well be placed at the free end of the rotor shaft 121, or at the junction between the two shafts. Similarly, it could be totally immersed or it could be dry mounted, in which case it is necessary to have a small diameter shaft outlet. It is not always essential to have such a sensor, and whether or not the sensor is provided depends essentially on how the actuator is controlled.

Thus, when the actuator is controlled by means of an open loop, e.g. if the actuator is a stepper motor, there is no need to detect the position of the plug. The same applies if the stator is actuated manually. In contrast, if the actuator is controlled in a closed loop, it is essential to have information on the position of the plug. This information can then come from a sensor that specifies various different specific positions taken up by the plug, or else by a measurement system that is more elaborate and that gives the angle of rotation of the plug.

The structure of the valve of the invention, as described above, is remarkable in that it enables an appreciable reduction in bulk to be obtained, particularly because unlike the conventional actuator as described in above-mentioned Document FR-A-2 539 204, which controls the plug from its side opposite from the feed channel, the actuator of the invention is on the same side as the connection pipework for which room must necessarily be found. In the valve of the invention, this pipework is merely increased a little in diameter over a short length thereof.

However, and above all, by completely eliminating any problem of dynamic sealing, the actuator of the invention provides increased lifetime and reliability and reduced maintenance. By eliminating all dynamic seals, no torque is consumed by such a seal.

It is also essential to observe that eliminating conventional shaft sealing also serves to eliminate the axial thrust that is usually generated by the pressure of the fluid acting on the surface of the shaft. That thrust can be very high. Thus, for an inside diameter of the plug shaft of 30 mm and a flow rate of 4 kg/s of liquid hydrogen at a pressure of 200 bars, the thrust is close to 10,490 N, which value should be compared with the axial force generated by changing the fluid flow direction, and which may be evaluated at 310 N.

It can thus be seen that in a conventional device with a dynamic shaft seal, a total axial force of 10,800 N is involved whereas with a device of the invention, the total axial force is reduced to 310 N, which is only about 3% of the previous value.

This greatly simplifies the system for taking up axial forces which, as mentioned above, can be reduced to simple bearings having no abutments. In the limit, because there is no headloss, or in any event very little headloss, due to using a plug valve with an axial flow, i.e. without a change in curvature level with the actuator, the actuator may be designed to operate without ball bearings, but with a small mechanical gap, of the order of 1 to 4 tenths of a millimeter.

Figure 7:
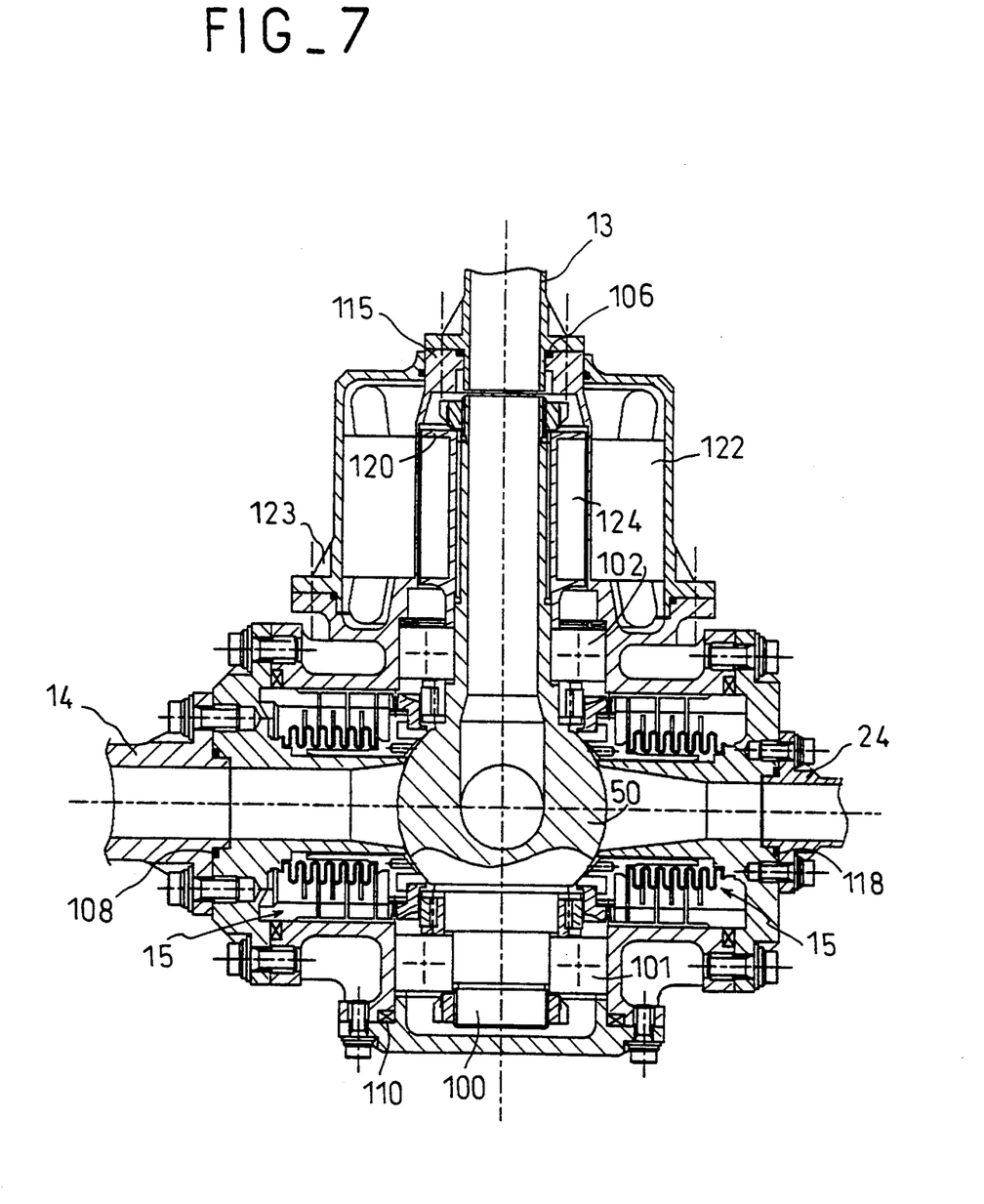
FIG. 7 is another more detailed diagram showing an embodiment of a valve of the invention in which the rotor of the actuator and the plug form a one-piece structure.

FIG. 7 shows an example of such an embodiment in which the shaft of the rotor and of the plug constitutes a single piece 50 which is supported solely by ball bearings 101 and 102. It may be observed that in this embodiment, the stator casing 123 is separate from the magnetic gap jacket which co-operates with the valve body to form a one-piece structure 115, which structure may advantageously be made of stamped small-gauge sheet metal. It would also be possible to secure the jacket to the body by welding. The other elements are identical to those described above and they are not described again. It should merely be observe that the valve shown is a three-port valve (one inlet, two outlets), and that each port is provided with its own sealing assembly 15. As before, a static O-ring 118 is disposed between the one-piece body 115 and the second distribution channel 24.

Like the preceding embodiment, the presence of the plug in the present embodiment makes it possible to use high flow rates and high pressures of the order of 200 bars and more, and even at such pressures, it provides very good leakproofing, the strong ball bearings 101 and 102 having no difficulty in taking up the forces generated by the pressure of the fluid in the closed position.

Figure 8:
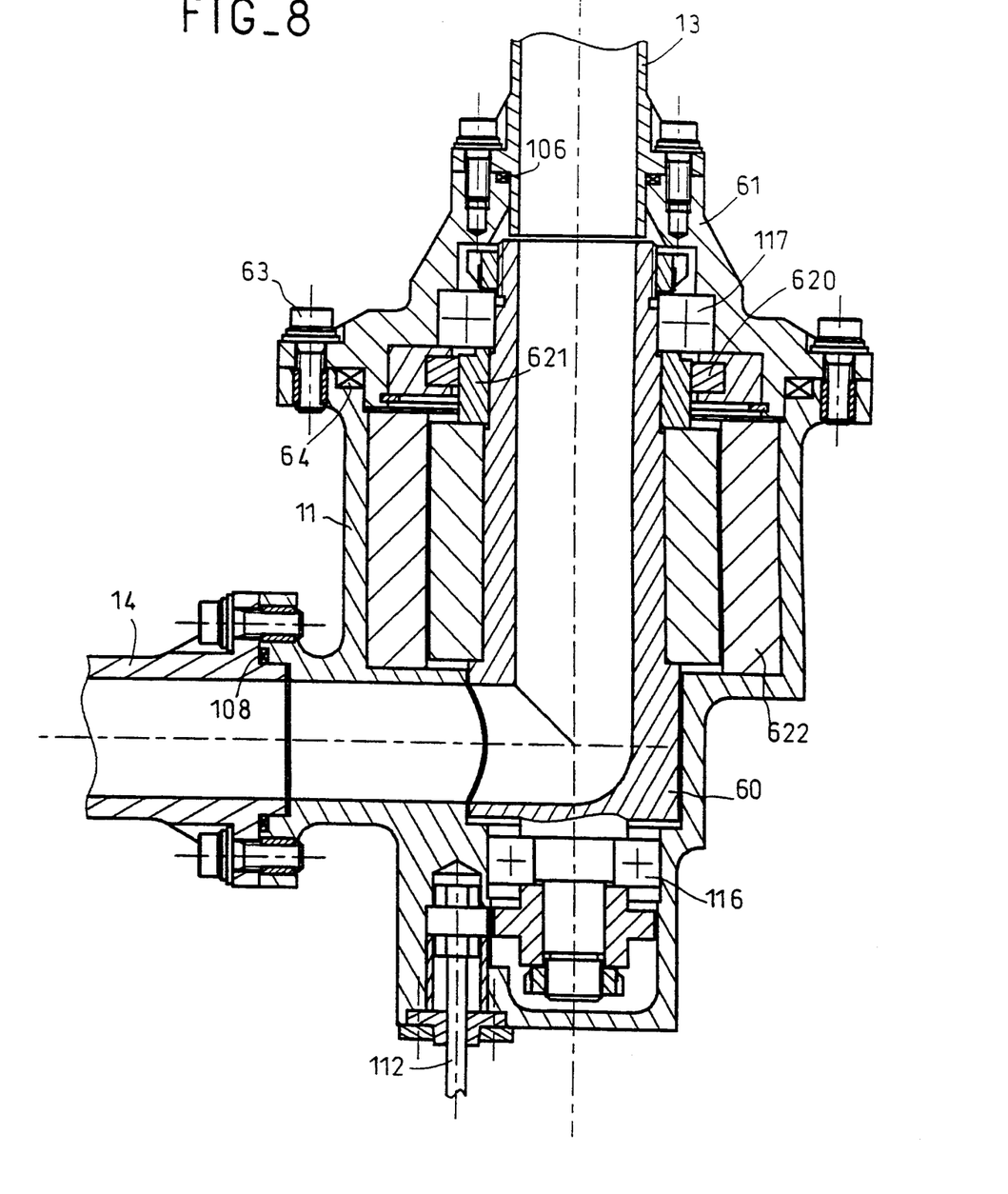
FIG. 8 shows another embodiment of a valve of the invention in which the actuator is fully immersed.

FIG. 8 shows a third embodiment of a leakproof valve of the invention under electrical control and having a distributor plug, and in which both the rotor and the stator are immersed. In addition, the rotor shaft and the cylindrical plug form a single piece 60 which is supported by ball bearings 116 and 117 located at each end of the piece.

The totally immersed actuator 62 is of the type comprising a motor with brushes, having a wound rotor 624 and a permanent magnet stator 622. FIG. 8 shows the brushes 620 bearing against the commutator 621.

To facilitate assembly of the motor, the valve body (which also includes the actuator) is made in two parts 11 and 61 that are held together by fasteners 63, with static sealing being provided by an O-ring 64.

O-rings 106 and 108 serve respectively to provide static sealing between the feed channel 13 and the top of the valve body 61, and between the bottom of the valve body 11 and the delivery channel 14.

We claim:

1. An electrically controlled leakproof valve comprising a fluid feed channel and at least one delivery channel for said fluid, rotary displacement of a distributor plug of said valve being controlled by an actuator, the actuator comprising a rotor that is axially pierced and through which the fluid from the feed channel flows without headloss, said actuator connected to a valve body, said connection being provided in sealed manner without using dynamic sealing devices.

2. A leakproof valve according to claim 1, wherein said actuator further includes a stator and a magnetic gap, said magnetic gap located between said rotor and said stator, said magnetic gap occupied by a jacket which co-operates with the valve body to form a one-piece structure that confines the fluid.

3. A leakproof valve according to claim 1, wherein actuator is of the permanent magnet type, the rotor being movable under drive from a manually actuated stator.

4. A leakproof valve according to claim 1, wherein the stator is also immersed in the fluid, fluid confinement then being provided directly by the casing of the stator.

5. A leakproof valve according to claim 1, wherein the connection between the actuator rotor and the plug is provided by means of a claw coupling.

6. A leakproof valve according to claim 1, wherein the actuator rotor and the plug form a single element.

7. A leakproof valve according to claim 1, further including ball bearings to take up the axial forces generated by the pressure of the fluid.

8. A leakproof valve according to claim 7, further including simple smooth bearings to take up the axial forces generated by the pressure of the fluid in the actuator.

9. A leakproof valve according to claim 1, further comprising at least one fluid outlet, said at least one fluid outlet including a sealing assembly.

10. A leakproof valve according to claim 1, wherein the feed channel constitutes an outlet port for the fluid and wherein the delivery channel constitutes a plurality of inlet ports for the fluid, thereby providing a mixer valve.

11. A leakproof valve according to claim 1, wherein the actuator is under open loop type control.

12. A leakproof valve according to claim 11, wherein the actuator is constituted by a stepper motor.

13. A leakproof valve according to claim 1, wherein the actuator is under closed loop type control.

14. A leakproof valve according to claim 13, further including a detector for detecting certain predetermined angular positions of the plug.

15. A leakproof valve according to claim 13, further including a device for measuring the angle of rotation of the plug.

16. A leakproof valve according to claim 1, further including a sealed stepdown gear unit disposed on the feed channel between the actuator rotor and the plug.

17. A leakproof valve according to claim 1, wherein it is suitable for use in a cryogenic environment.

* * * * *